(12) United States Patent
Mattingly et al.

(10) Patent No.: US 10,513,077 B2
(45) Date of Patent: Dec. 24, 2019

(54) SYSTEM AND METHODS FOR THREE DIMENSIONAL PRINTING WITH BLOCKCHAIN CONTROLS

(71) Applicant: Walmart Apollo, LLC, Bentonville, AR (US)

(72) Inventors: Todd Davenport Mattingly, Bentonville, AR (US); David G. Tovey, Rogers, AR (US); John Jeremiah O'Brien, Farmington, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/913,382

(22) Filed: Mar. 6, 2018

(65) Prior Publication Data

US 2018/0257306 A1    Sep. 13, 2018

Related U.S. Application Data

(60) Provisional application No. 62/469,148, filed on Mar. 9, 2017.

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/386* (2017.08); *B33Y 50/00* (2014.12);
(Continued)

(58) Field of Classification Search
None
See application file for complete search history.

(56) References Cited

U.S. PATENT DOCUMENTS

2013/0311519 A1    11/2013    Deking et al.
2014/0043441 A1*   2/2014    Borenstein ............ B29C 64/106
                                                                        348/47
(Continued)

OTHER PUBLICATIONS

International Search Report and Written Opinion from related International Patent Application No. PCT/US2018/021141 dated Apr. 27, 2018.

(Continued)

*Primary Examiner* — Ziaul Karim
(74) *Attorney, Agent, or Firm* — McCarter & English, LLP; David R. Burns

(57) ABSTRACT

Described in detail herein is a blockchain license storage system. A computing system can receive instructions to fabricate a three-dimensional physical object from a mobile device. The instructions can include a design of the three-dimensional physical object. The computing system can control a printing device to fabricate the at least one three-dimensional physical object based on the design of the at least one three-dimensional physical object. The computing system can generate a license file for the design of the at least one three-dimensional physical object. The computing system can generate a cryptographically verifiable ledger represented by a sequence of blocks. One of the blocks in the sequence of blocks can store transactional records associated with the generated license.

16 Claims, 11 Drawing Sheets

(51) Int. Cl.
*H04L 9/08* (2006.01)
*H04L 9/06* (2006.01)
*H04L 9/32* (2006.01)
*B33Y 50/00* (2015.01)
*B29C 64/386* (2017.01)

(52) U.S. Cl.
CPC ............ *B33Y 50/02* (2014.12); *H04L 9/0637* (2013.01); *H04L 9/0643* (2013.01); *H04L 9/0825* (2013.01); *H04L 9/3236* (2013.01); *H04L 9/3297* (2013.01); *H04L 2209/38* (2013.01); *H04L 2209/56* (2013.01)

(56) References Cited

U.S. PATENT DOCUMENTS

| | | | |
|---|---|---|---|
| 2014/0058959 | A1 | 2/2014 | Isbjornssund et al. |
| 2015/0310188 | A1* | 10/2015 | Ford ................. G06F 21/10 726/28 |
| 2016/0203572 | A1 | 7/2016 | Mcconaghy et al. |
| 2017/0048253 | A1 | 2/2017 | Anton et al. |
| 2018/0012311 | A1* | 1/2018 | Small .................... B33Y 50/02 |

OTHER PUBLICATIONS

De Filippi, Primavera, et al., How Blockchains Can Support, Complement, or Supplement Intellectual Property, Coalition of Automated Legal Applications, Version 1.0, May 2016.

Ng, Kong-Chor, et al., A 3D Content Cloud: Sharing, Tranding and Customizing 3D Print-ready Objects, IEEE Second International Conference on Multimedia Big Data, 2016.

The UK has opportunity to Innovate the Intellectual Property Sector, http://www.creativebarcode.com/newsitem.html?item=129, last viewed Sep. 28, 2016.

McKendrick, Joe, 6 reasons to love blockchain technology: Blockchain technology is coming to the business mainstream, with some surprising benefits, ZDNet, http://www.zdnet.com/article/6reasonstoloveblockchaintechnology/, May 14, 2016.

Carey, Scott, Meet the startups trying to take blockchain beyond fintech, and why they still have a long way to go, Techworld, http://www.techworld.com/startups/meetstartupstryingtakeblockchainbeyondfintech3637740/, Apr. 5, 2016.

Tapscott, Don, et al., The Impact of the Blockchain Goes Beyond Financial Services, Harvard Business Review, May 10, 2016.

Herbert, Jeff, et al., A Novel Method for Decentralised Peer-to-Peer Software License Validation Using Cryptocurrency Blockchain Technology, Proceedings of the 38th Australasian Computer Science Conference (ACSC 2015), Sydney, Australia, Jan. 27-30, 2015.

* cited by examiner

SYSTEM AND METHODS FOR THREE DIMENSIONAL PRINTING WITH BLOCKCHAIN CONTROLS

CROSS-REFERENCE TO RELATED PATENT APPLICATIONS

This application claims priority to U.S. Provisional Application No. 62/469,148 filed on Mar. 9, 2017, the content of which is hereby incorporated by reference in its entirety.

BACKGROUND

Creation of three dimensional (3D) objects using a 3D printers is changing the manner, time, and place of manufacture. Users of 3D printers can generally generate one or more files from which the 3D objects can be printed.

BRIEF DESCRIPTION OF THE FIGURES

Illustrative embodiments are shown by way of example in the accompanying figures and should not be considered as a limitation of the present disclosure. The accompanying figures, which are incorporated in and constitute a part of this specification, illustrate one or more embodiments of the invention and, together with the description, help to explain the invention. In the figures.

DETAILED DESCRIPTION

Described in detail herein is a 3D printer blockchain system. A computing system can receive instructions to fabricate a three-dimensional physical object from an electronic device (e.g., mobile device). The instructions can include a design of the three-dimensional physical object. The computing system can control a printing device to fabricate the three-dimensional physical object based on the design. The computing system can generate a license file for the design of the three-dimensional physical object and can generate and maintain a cryptographically verifiable ledger represented by a sequence of blocks. Each block can contain one or more transaction records and each subsequent block contains a hash value associated with the previous block. One of the blocks contains transaction records associated with the license file for the design of the three-dimensional physical object. The block that contains transaction records associated with the license file restricts subsequent printing of the three-dimensional physical object.

The computing system can be programmed to assign a unique identifier to the three-dimensional physical object printed by the 3D printer. The block created for the instance of the three-dimensional physical object printed by the 3D printer contains transaction records associated with the unique identifier. A RFID tag encoded with the unique identifier can be secured to or embedded in the instance of the three-dimensional physical object printed by the 3D printer.

Each block in the cryptographically verifiable ledger can be associated with a public key and a private key. The computer system can be programmed to receive a request to access the block containing transaction records associated with the license file for the design of the three-dimensional physical object. The request includes with a first public key and a first private key associated with the block(s) that contains the transaction records associated with the license file and provide access to the license file for the design of the three-dimensional physical object in response to verifying the public key and private key. In response to printing of a second instance of the three-dimensional physical object based on access to the design, the computing system adds a new block for the second instance to the cryptographically verifiable ledger that contains transaction records associated with the license file for the design of the three-dimensional physical object.

Figure 1:
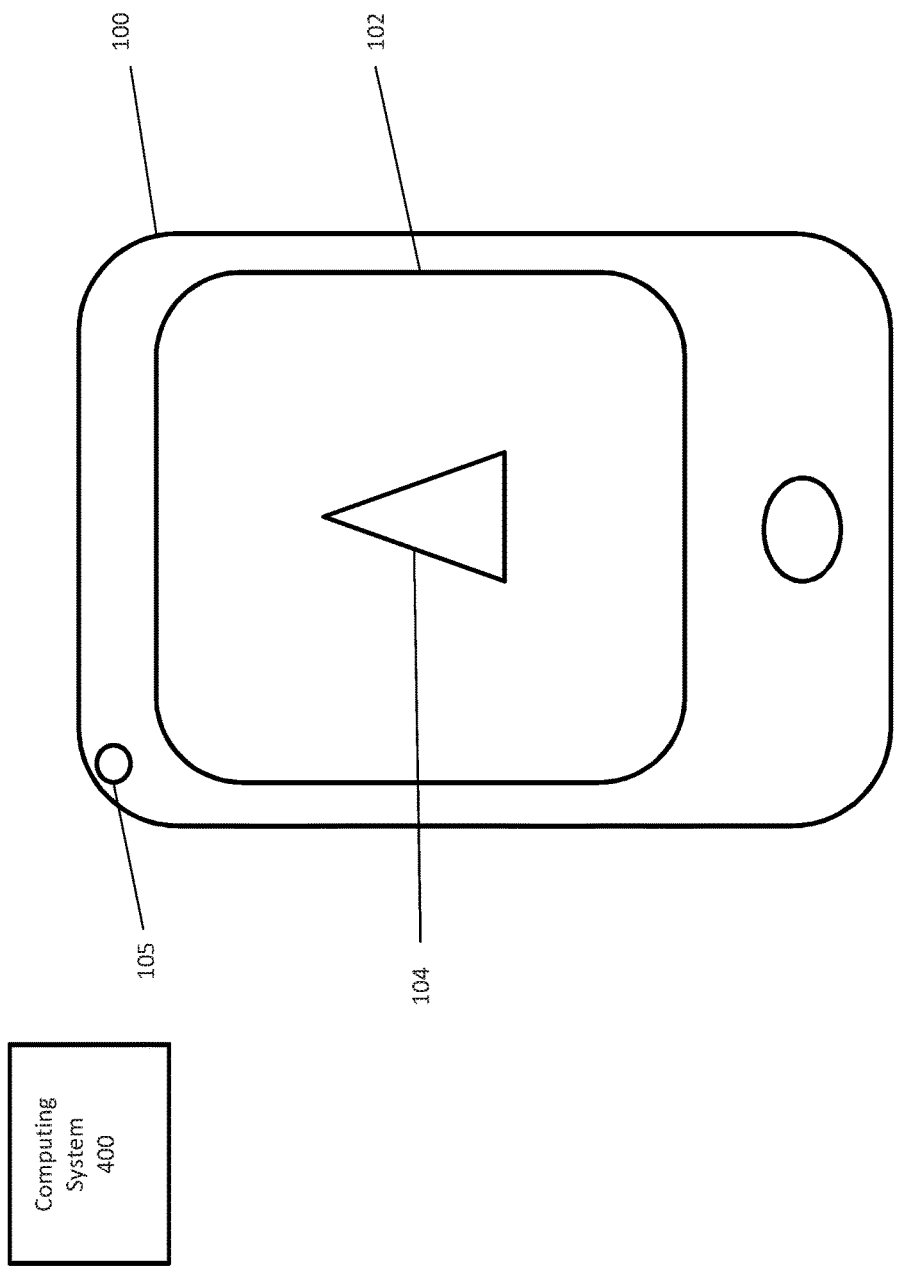
FIG. 1 is a block diagram of a device configured to design a 3D physical object in a design environment in accordance with an exemplary embodiment.

FIG. 1 is a block diagram of a device 100 designing a physical object in accordance with an exemplary embodiment. The device 100 can include a display 102 for providing an interface to an environment for designing a three-dimensional physical object. A user can interact with the device 100 via the interface to design a representation of a three-dimensional physical object 104. The display 102 can be a multi-touch screen and the user can generate a representation of a physical object 104 by interacting with the display 102, which can be stored in-memory as a design file.

In some embodiments, the device 100 can execute an application associated with a facility in which a one or more 3D printers reside. The application can execute the user interface displayed on the display 102. The application can provide templates to generate a representation of a three-dimensional physical object. Alternatively, the user can generate the three-dimensional physical object using drawing tools provided by the application. Once the user has completed generating a representation of the three-dimensional physical object 104, the user can select a submit button. The device 100 can transmit the representation of the three-dimensional physical object 104 (e.g., can transmit the design file including the representation of the three-dimensional physical object) and instructions to fabricate an instance of the three-dimensional physical object based on the representation of the physical object 104 to a computing system for controlling an operation of one of the 3D printers in the facility. An embodiment of the computing system will be discussed in further detail with reference to FIG. 8.

In some embodiments, the device 100 can include an image capturing device 105. The image capturing device 105 can be configured to capture still and moving images. The image capturing device 105 can capture an image of a physical object. The device 100 can transmit the captured image to the computing system.

Figure 2:
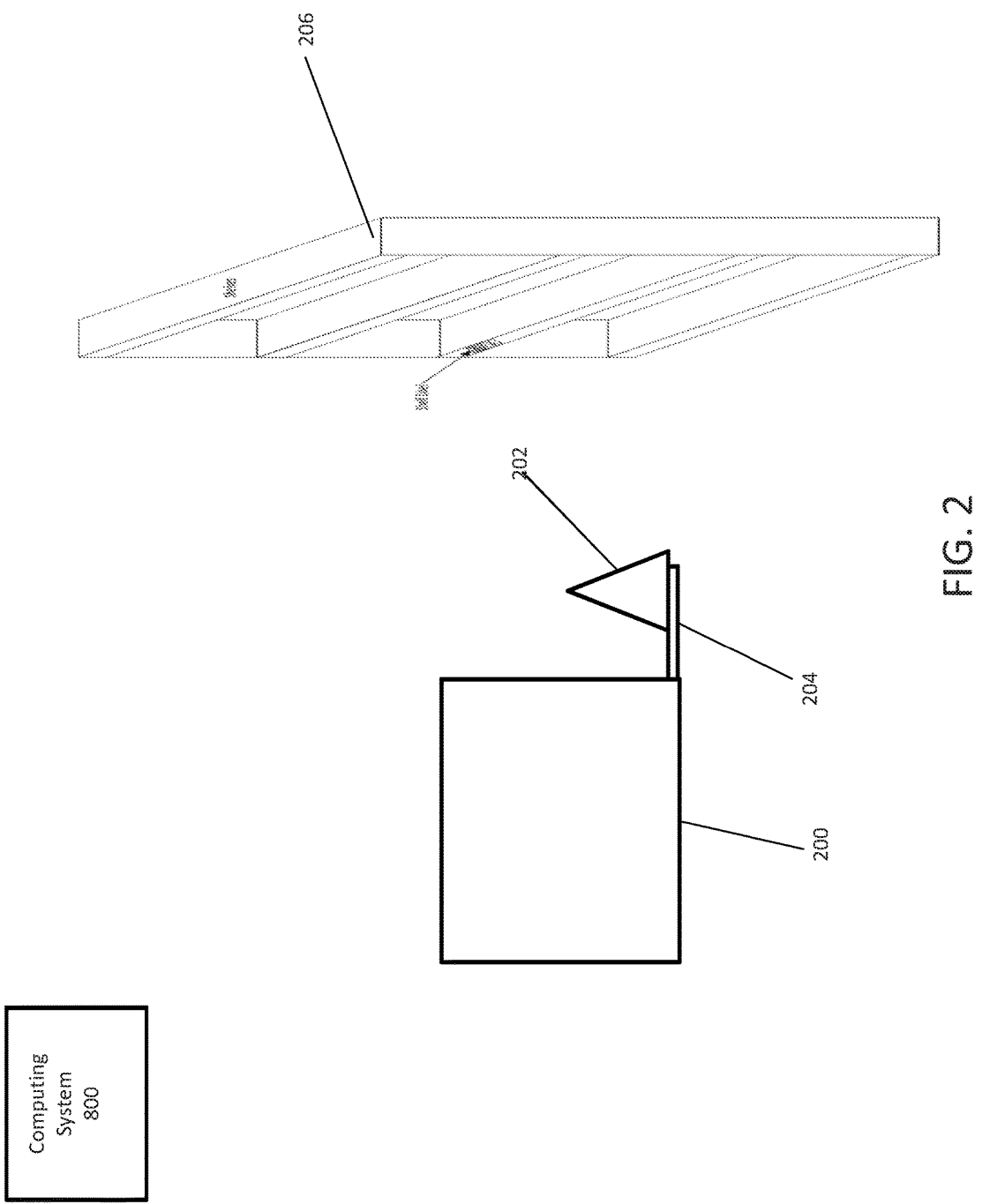
FIG. 2 illustrates a 3D printer configured to generate a 3D physical object in accordance with an exemplary embodiment.

FIG. 2 illustrates a 3D printer generating a physical object in accordance with an exemplary embodiment. The 3D printer 200 can be disposed in a facility and can receive instructions from a computing system 800 to fabricate a three-dimensional physical object 202 based on the representation of the physical object created by the user as discussed above. The instructions can include a design file that includes the representation of the three-dimensional physical object as well as information associated with the three-dimensional physical object such as size, dimensions, color, and material to be used. The 3D printer 200 can fabricate the three-dimensional physical object 202 and dispense the physical object on a print bed or tray 204. When an instance of the physical object 202 is completed by the 3D printer 200, the instance can be placed or deposited on a shelving unit 206 for pick up by the user. The shelving unit 206 can also be a locker unit. The user can pick up the instance of the physical object from the shelving unit 206 disposed in the facility.

Figure 3:
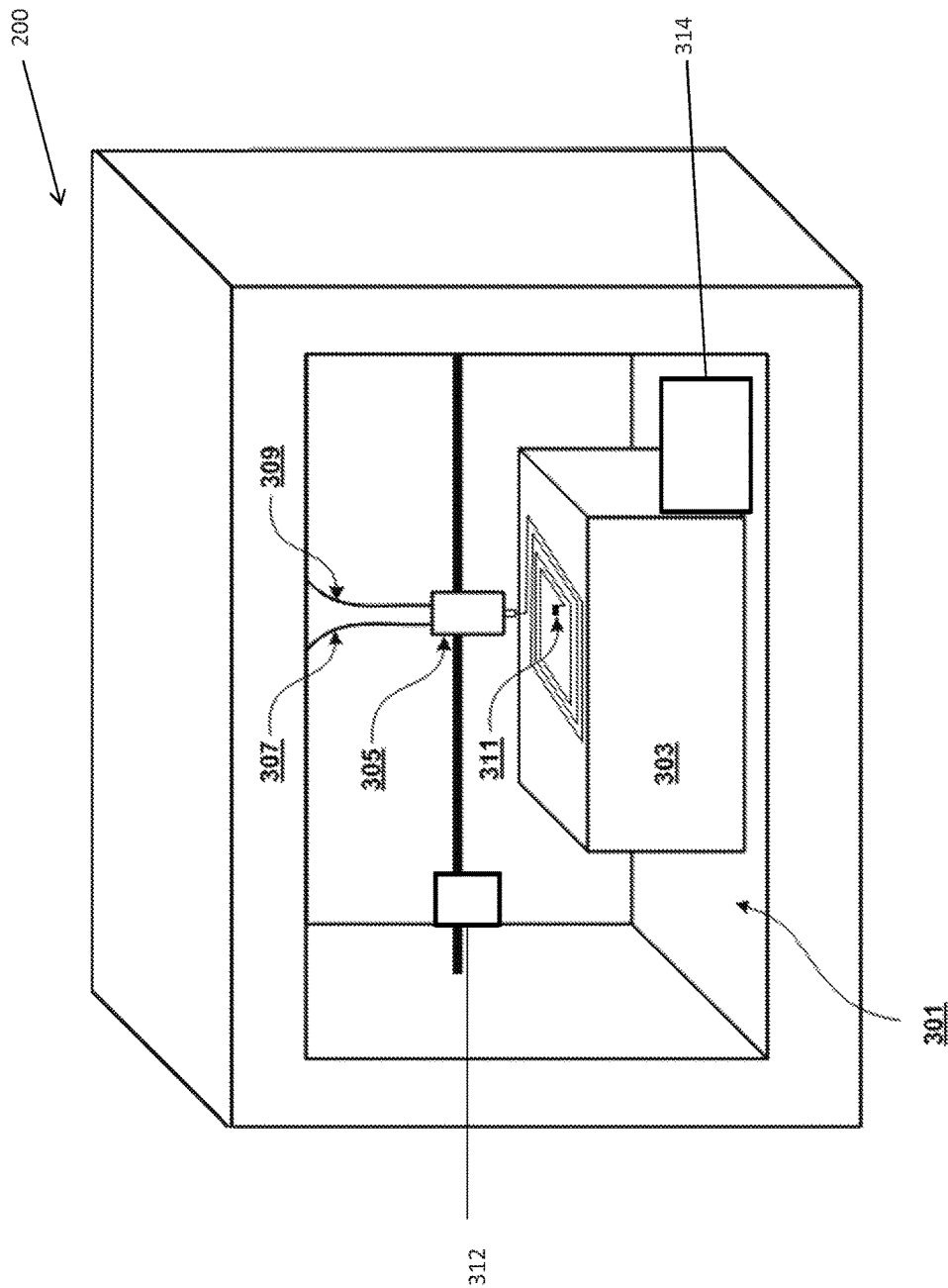
FIG. 3 is a block diagram of a 3D printer in accordance with an exemplary embodiment.

FIG. 3 shows an example 3D printer 200 for printing a three dimensional physical object 303 In this example embodiment, the 3D printer 200 includes an extruder 305 or 3D printer head that is configured to receive one or more spools or filaments of material (e.g., a first material 307 and a second material 309). The extruder 305 can selectively extrude the material to print the three dimensional product 303 on a print bed 301 The print bed 301 can be heated or unheated. The one or more materials fed into the extruder 305 can include the plastic or resin (and/or other materials) to fabricate the three-dimensional physical object 303. One or more motors 312 can control the motion of the extruder 305. A controller 314 and can be operatively coupled to the extruder 305, the one or more motors 312, and print bed 301. The controller 314 can control the operations of the one or more motors 312, the extruder 305, and the print bed 301.

The controller 314 can receive instructions to fabricate an instance of the three-dimensional physical object 303 based on a representation of the physical object as described herein. In some embodiments, the extruder can heat and melt the one or more materials before dispensing the material on the print bed 301 and/or can sinter the material as it is deposited on the print bed 301. In some embodiments, the extruder 305 can include a motor, a fan, a heat sink, a thermistor, a heating block, and a nozzle. The material can be dispensed through the nozzle after being heated by the heating block.

The controller 314 can control the one or more motors to control the motion of the extruder 305 to generate the structure of the instance of the three-dimensional physical object 303 on the print bed 301. The one or more motors 314 can move the extruder 305 along three axes, e.g., the X, Y and Z axis. Alternatively, the extruder 305 can be suspended using three arms, and the arms can move along the X, Y and Z axis at different rates.

In some embodiments, an RFID tag can be affixed to the three-dimensional product 303 after it is printed by the 3D printer 200 or can be embedded in or integrally formed with the three-dimensional physical object. For example, one or more of the material fed into the extruder 305 can include RFID tags or RFID chips and antenna material (which together can form an RFID tag). As the extruder 305 builds the three-dimensional physical object 303 on the print bed 301, the material(s) including the RFID tags (or components thereof can be extruded by the extruder such that one or more RFID tags are disposed within or on the three-dimensional physical object 303.

Figure 4:
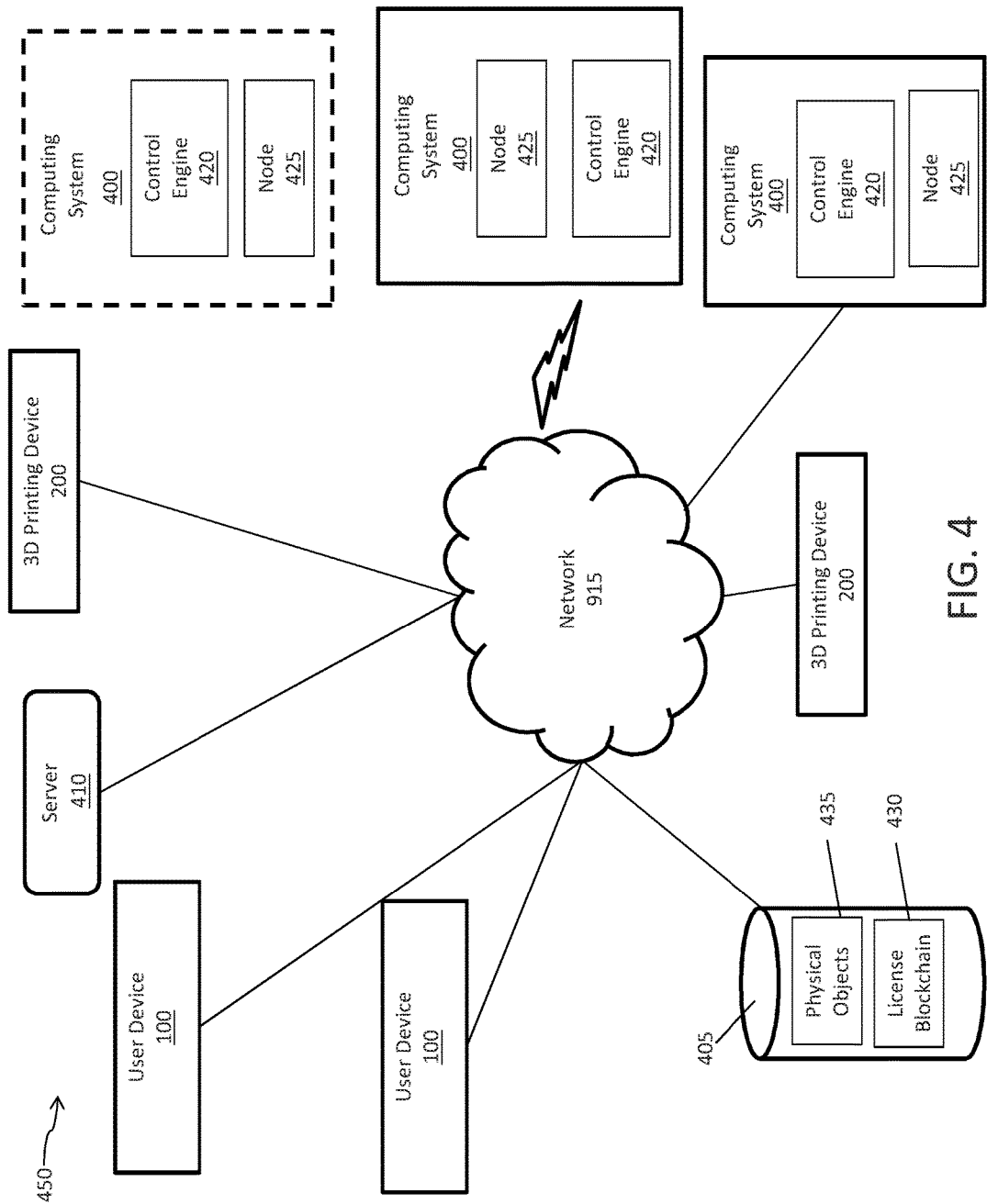
FIG. 4 illustrates an exemplary 3D printer blockchain system in accordance with an exemplary embodiment.

FIG. 4 illustrates an exemplary 3D printer blockchain system 450 in accordance with an exemplary embodiment. The 3D printer blockchain system 450 can include one or more data stores 405, one or more computing systems 400, one or more 3D printers 200, and one or devices 100 (e.g., user devices). The computing system 400 can be in communication with the data stores 405, the 3-D printers 200, and the devices 100 via a communications network 415. The computing system 400 can implement at least one instance of a control engine 420. The control engine 420 can be an executable application executed on the computing system 400. The control engine 420 can execute the process of the 3D printer blockchain system 450 as described herein. The computing system 400 can include one or more nodes 425. Each of the one or more nodes 425 can store a copy of a blockchain record and/or a shared ledger associated with an operation of one or more of the 3D printers 200. The one or more nodes 425 can be configured to update the blocks in the blockchain record based on the operation of one or more of the 3D printers 200.

In an example embodiment, one or more portions of the communications network 415 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The computing system 400 includes one or more computers or processors configured to communicate with the data stores 405, the 3D printers 200 and the devices 100. The data stores 405 can store information/data, as described herein. For example, the data stores 405 can include a physical objects database 835 and a 3D printer blockchain 430. The physical objects database 435 can include information associated with physical objects and representation of physical objects. The blockchain 430 can be embodied as a blockchain storage system that is configured to store a blockchain record or a shared ledger based on an operation of the 3D printers 200 and information associated with representations of three-dimensional physical objects that can be printed by the 3D printers. For example, the blockchain storage system can store digital licenses or rights associated with designs of a physical object and the computing system 400 can use the blocks of the blockchain to control an operation of the 3D printers (e.g., to prevent or enable printing of three-dimensional physical objects associated with designs of the three-dimensional physical objects for which the blockchain(s) exist. The data stores 405 and the computing system 400 can be located at one or more geographically distributed locations from each other. Alternatively, the data stores 405 can be included within the computing system 400.

In exemplary embodiments, a user of one of the devices 100 can generate a representation of a physical object on the device 100 forming a design file for representation of the physical object. The user can also enter information associated with the physical object on the device 100. The information can be one or more of size, dimensions, color and material of the physical object. The representation of the physical object can be an image of the physical object. The device 100 can transmit the representation of the physical object and the information associated with the computing system 400. The computing system 400 can execute the control engine 420 in response to receiving the representation of the physical object and the information associated with the physical object. The control engine 420 can store the representation of the physical object and the information associated with the physical object in the physical objects database 435.

The control engine 420 can instruct one of the 3D printers 200 to fabricate a three-dimensional physical object based on the design file associated with the representation of the physical object and the information associated with the physical object. The 3D printer 200 can be disposed in a facility and can fabricate the three-dimensional physical object in response to the instructions. Thereafter, the physical object can be stored in a shelving unit or storage unit of a facility. The control engine 420 can transmit a message to the device 100 operated by the user to indicate that the physical object is ready for pickup.

In some embodiments, a RFID tag including a unique identifier can be secured to or embedded in the fabricated three-dimensional physical object. The unique identifier can be included in the message to the device. The physical object can be picked up from the facility using the unique identifier (e.g., an RFID reader can be used to identify the physical object and the identifier of the read RFID tag can be verified against the identifier sent to the user).

In response to receipt of a design file or the fabrication of the physical object, the control engine 420 can generate a digital license file for the design of the representation of the physical object. The control engine 420 can restrict other users to request a fabricated three-dimensional physical object of the same design as the representation of the physical object without the digital license file.

The digital license file can be stored in the license blockchain database 430 using the blockchain storage system. For example, the node 425 can generate a block in the license blockchain database 430. The block can store the digital license file. A private and public key can be associated with the block storing the digital license file. Each of the blocks can include a public key and a private key. A user can grant access to another user by providing the public and private key to the block storing the digital license file. The other user can attempt to access the digital license file using the public and private key of the block. The node 425 can verify the public and private key of the block and provide access to the digital license file in response to verification. The node 435 can generate a subsequent block including transaction records of the other user successfully gaining access to the digital license file. A private key and public key associated to the subsequent block can be included in the subsequent block. The user who is the owner of the digital license file, can provide access to the block with the digital license file. In the event, an attempt is made to access the digital access file with an incorrect public and/or private key, the node 435 can restrict access to the digital license file. The node 835 can also generate a new block including transaction records associated with the failed attempt at accessing the digital license file.

Each new block created associated with accessing the digital license file can include a hash key associated with the previous block. This can be referred to as a chain. For example, in the event the block containing the digital license file is accessed, and a block is generated including transaction records associated the granted access. The new block can include a hash key of the block containing the digital license file. Side chains can also be created. For example, in the event there is a failed attempt to access the block containing the digital license file and the block is generated including transaction records associated with the failed access, the newly generated block can include a hash key of the block containing the digital license. However, the newly generated block may not include a hash key of the block including transaction records associated with the granted access to the block containing the digital license file. Accordingly, the block containing the digital license file can be linked in two different chains.

In the event a user is able to access the block with the digital license file, user can transmit a request to fabricate the three-dimensional physical object associated with the digital license file, to the computing system. The control engine 420 verify the digital license file and query the physical objects database 435 to retrieve the representation of the physical object and the information associated with the physical object. The control engine 420 can instruct the 3-D printer 200 to fabricate the three-dimensional physical object based on the representation of the physical object and the information associated with the physical object. The 3-D printer 200 can fabricate the three-dimensional physical object in response to receiving instructions.

For example, each digital license that is created can include a unique identifier. The unique identifier can identify the design of the physical object. The identifier can be encoded into a machine-readable element. The machine-readable element can be made available by the user to subsequent user to access the design. A subsequent user can scan the machine-readable element to gain access to the design. In response to scanning and decoding the identifier from the machine-readable element, the identifier can be transmitted to the computing system. The node 425 can verify the identifier is associated with the digital license of the design stored in a block in the license blockchain 420. The node 425 can also determine the subsequent user is permitted access based on the received identifier. The node can 425 can grant access to the block including the digital license file and can also generate a block including the transaction records of the granted access and a hash key of the block including the digital license file. The subsequent user can transmit a request to fabricate the three-dimensional physical object associated with the digital license file, to the computing system 400. The control engine 420 verify the digital license file and query the physical objects database 435 to retrieve the representation of the physical object and the information associated with the physical object. The control engine 420 can instruct the 3-D printer 200 to fabricate the three-dimensional physical object based on the representation of the physical object and the information associated with the physical object. The 3-D printer 200 can fabricate the three-dimensional physical object in response to receiving instructions.

In some embodiments, the user who originally created the design can limit the number of digital licenses that can be accessed. The node 425 can restrict access to the digital license if the number of digital licenses granted have met the maximum number of digital licenses permitted by the user. The node 425 can also restrict access to the digital license in response to receiving a wrong identifier associated with the design. Each time the node restricts access to the digital license, it can generate a new block including the transactions records of the restricted access and a hash key of the block including the digital license.

As a non-limiting example, the blockchain license system 450 can be implemented in a retail store. A customer can request to fabricate a three-dimensional product an purchase the product. A customer using a device 100 can generate a representation of a product on the device 100. The customer can also enter information associated with the product on the device 100. The information can be one or more of size, dimensions, color and material of the product. The representation of the product can be an image of the product. The device 100 can transmit the representation of the product and the information associated with the computing system 400. The computing system 800 can execute the control engine 420 in response to receiving the representation of the product and the information associated with the product. The control engine 420 can store the representation of the physical object and the information associated with the product in the physical objects database 435.

In some embodiments, the device 100 can include an image capturing device. The image capturing device can capture an image of a physical object. The device 100 can transmit the image of the physical object to the computing system 400 for fabrication of a three-dimensional physical object based on the captured image of the physical object.

The control engine 420 can instruct the 3-D printer 200 to fabricate a three-dimensional product based on the representation of the product and the information associated with the product. The 3-D printer can be disposed in a facility. The 3-D printer 200 can fabricate the three-dimensional product and the product can be stored in a shelving unit or storage unit of a facility. The control engine 420 can transmit a message to the device 100 indicating the product is ready for pickup.

In some embodiments, a RFID tag including a unique identifier can be secured to the fabricated three-dimensional product. The unique identifier can be included in the message to the device. The product can be picked up from the facility using the unique identifier. In response to the fabrication of the product the control engine 420 can generate a digital license file for the design of the representation of the product. The control engine 420 can restrict other customers to request a fabricated three-dimensional product of the same design as the representation of the product without the digital license file. The digital license file can be stored in the license blockchain 430 using the blockchain storage system as described above. In the event a customer is able to access the block with the digital license file, customer can transmit a request to fabricate the three-dimensional product associated with the digital license file, to the computing system. The control engine 420 verify the digital license file and query the physical objects database 435 to retrieve the representation of the product and the information associated with the product. The control engine 820 can instruct the 3-D printer 200 to fabricate the three-dimensional product based on the representation of the product and the information associated with the product. The 3-D printer 200 can fabricate the three-dimensional product in response to receiving instructions.

As a non-limiting example, a root or genesis block in a block chain can be generated by the computing system 400 in response to receiving a design file associated with a representation of a three-dimensional physical object. A unique identifier and rules can be associated with the design file and can be stored in the root/genesis block. In exemplary embodiments, the rules can be specified by the user that submits the design file to the computing system 400 (e.g., the creator, owner, or holder of the design file). Upon creating the identifier, the identifier can be sent to the user and/or can be encoded into a machine-readable element that is printed on a label and displayed in a facility or posted on a webpage. The machine-readable element can be made available by the others to allow for access to the design file for printing an instance of the three-dimensional physical object associated with the design file by one of the 3D printers 200. When a request to print the three-dimensional object based on the design file is received, the computing system 400 can prevent the 3D printer from printing an instance of the three-dimensional physical object associated with the design file if the request cannot be authenticated against the blockchain for the design file.

As another example, a user can distribute or sell the design file and provide a machine-readable element when a subsequent customer purchases the design file. A subsequent customer can scan the machine-readable element to gain access to the design file. In response to scanning and decoding the identifier from the machine-readable element, the identifier can be transmitted to the computing system 400. The node 425 can verify the identifier is associated with a digital license of the design file stored in a block in the blockchain 430. The node 425 can also determine that the subsequent customer is permitted to access the design file based on the received identifier. The node can 425 can grant access to the block including the digital license file and can also generate a new block including the transaction records of the granted access and a hash key of the block including the digital license file. The subsequent customer can transmit a request to fabricate the three-dimensional physical object associated with the digital license file to the computing system 400. The control engine 420 verify the digital license file and query the physical objects database 435 to retrieve the representation of the physical object and the information associated with the physical object. The control engine 420 can prevent or enable the 3D printer 200 to fabricate the three-dimensional physical object based on the representation of the physical object and the information associated with the physical object based on whether the computing system 400 can authenticate the request. If the request is authenticated, the 3D printer 200 can fabricate the three-dimensional physical object in response to receiving instructions from the computing system 400.

In some embodiments, the customer who originally created the design can limit the number of digital licenses that can be accessed. The node 425 can restrict access to the digital file if the number of digital licenses granted have met the maximum number of digital licenses permitted by the user (e.g., specified by the user at the time the user submits the design file to the computing system 400). The node 425 can also restrict access to the digital file in response to receiving a wrong identifier associated with the design. Each time the node restricts access to the digital file, it can generate a new block including the transactions records of the restricted access and a hash key of the block including the digital license.

Descriptions of some embodiments of blockchain technology are provided with reference to FIGS. 5-10 herein. In some embodiments, blockchain technology may be utilized to store digital licenses for design files associated with physical objects that can be printed by 3D printer(s) as described herein. One or more of the computing systems described herein may comprise a node in a distributed blockchain system storing a copy of the blockchain record. Updates to the blockchain may comprise digital licenses for the designs of the physical objects and the designs, and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of being kept at a trusted party. However, exemplary embodiments of the present disclosure can also utilize a private (trusted) system to maintain the blockchains. A blockchain may generally refer to a distributed database that maintains a growing and ordered list or chain of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, the 3D printer blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, e.g., resulting from in-field authentication of autonomous electronic devices, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

Figure 5:
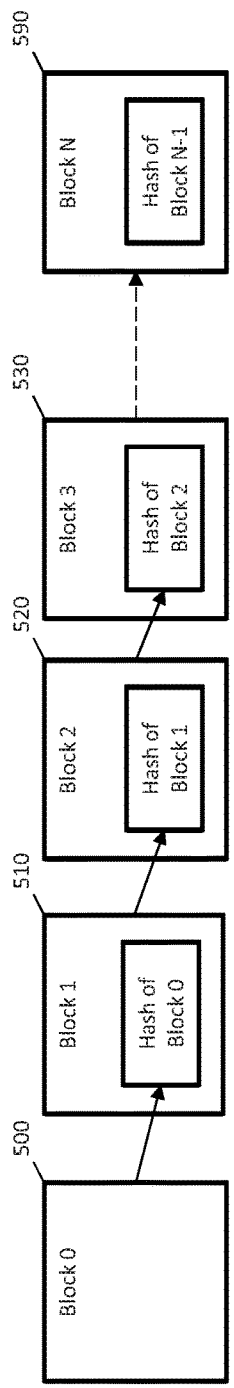
FIG. 5 comprises an illustration of blocks as configured in accordance with an exemplary embodiment.

Now referring to FIG. 5, an illustration of a blockchain according to embodiments of the present disclosure is shown. As mentioned in above, with reference to FIG. 4, a blockchain comprises a hash chain or a hash tree in which each block added in the chain contains a hash of the previous block. In FIG. 5, block 0 500 represents a genesis block of the chain and can be generated in response to receipt of a design file from a user that can be used to generate a 3D printed instance a physical object. The block 0 500 can include a digital license associated with the design file, the design file, restrictions/rules associated with the design file, and/or any other suitable information/data. Block 1 510 can be generated in response to a request from a user to access the design file and/or print an instance of the physical object based on the design file. The block 1 510 can contain a hash of block 0 500. If the request is authenticated the computing system can control a 3D printer to print the physical object and the block 1 510 can include the digital license. Otherwise, the block 1 510 can include an indication that the user's request was not authenticated. Additional blocks can be generated as additional requests are received and each block that is generated can include a hash of a previous block. For example, block 2 520 can be generated in response to a subsequent request and can contain a hash of block 1 410, block 3 530 can be generated in response to a yet another subsequent request and can contain a hash of block 2 520, and so forth. Continuing down the chain, block N contains a hash of block N-1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, the blocks generated by the computing system can contain rules and data for authorizing different types of actions and/or parties who can take action as described herein. In some embodiments, transaction and block forming rules may be part of the software algorithm on each node. When a new block is being formed, any node on the system can use the prior records in the blockchain to verify whether the requested action is authorized. For example, a block may contain a public key associated with the user of a user device that purchased/acquired design that allows the user to show possession and/or transfer the digital license using a private key. Nodes may verify that the user is in possession of the digital license and/or is authorized to transfer the digital license based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. Nodes can compete to provide proof-of-work to form a new block, and the first successful node of a new block earns a reward.

Figure 6:
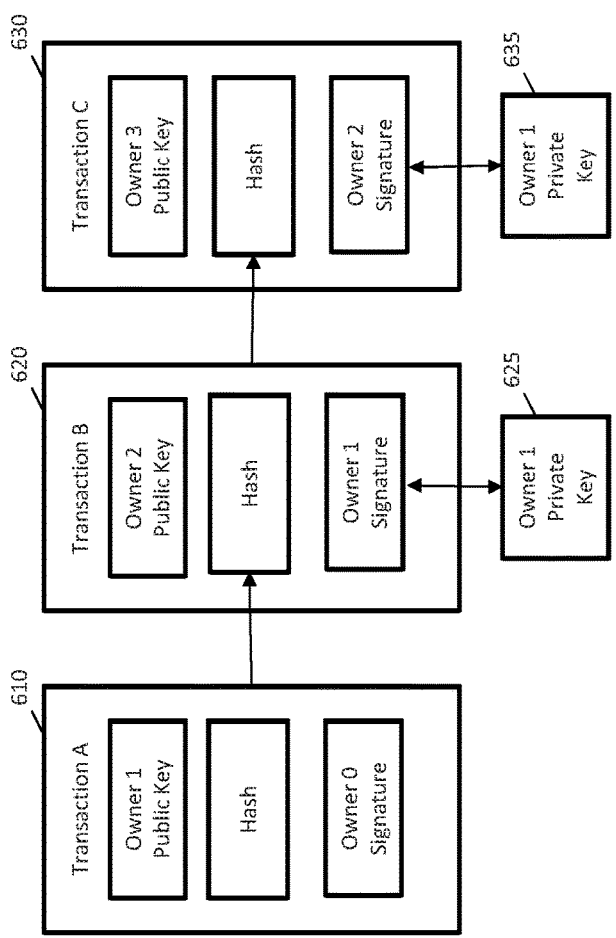
FIG. 6 comprises an illustration of transactions configured in accordance with an exemplary embodiment.

Now referring to FIG. 6, an illustration of blockchain based transactions according to some embodiments is shown. In some embodiments, the blockchain illustrated in FIG. 6 comprises a hash chain protected by private/public key encryption. Transaction A 610 represents a transaction recorded in a block of a blockchain showing that owner 1 (recipient) (e.g., a first user of the first user device who purchased and/or acquired the design file from owner 0). Transaction A 610 contains owner's 1 public key and owner 0's signature for the transaction and a hash of a previous block. When owner 1 (e.g., the first user of the first user device who purchased and/or acquired the design) transfers the design file to owner 2 (e.g., a second user of a second user device), a block containing transaction B 620 is formed. The record of transaction B 620 comprises the public key of owner 2 (recipient), a hash of the previous block, and owner 1's signature for the transaction that is signed with the owner 1's private key 525 and verified using owner 1's public key in transaction A 510. If owner 2 (e.g., the second user) transfers the asset to owner 3 (the third user), a block containing transaction C 530 is formed. The record of transaction C 530 comprises the public key of owner 3 (recipient), a hash of the previous block, and owner 2's signature for the transaction that is signed by owner 2's private key 635 and verified using owner 2's public key from transaction B 620. In some embodiments, when each transaction record is created, the system may check previous transaction records and the current owner's private and public key signature to determine whether the transaction is valid. In some embodiments, transactions are be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 6 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 7:
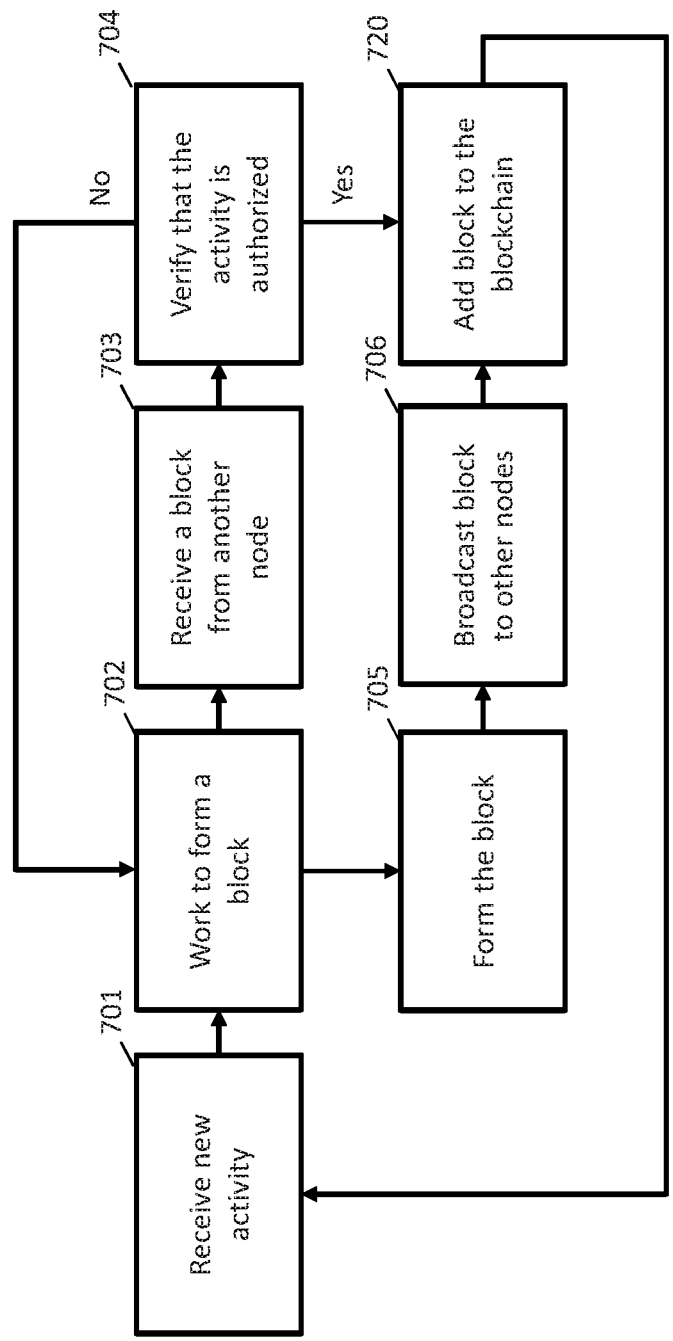
FIG. 7 comprises a flow diagram in accordance with an exemplary embodiment.

Now referring to FIG. 7, a flow diagram according to some embodiments is shown. In some embodiments, the steps shown in FIG. 7 may be performed by a computer system as described in FIG. 4, a server, a distributed server, a timestamp server, a blockchain node, and the like. In some embodiments, the steps in FIG. 7 may be performed by one or more of the nodes in a system using blockchain for record keeping.

In step 701, a node receives a new activity in response to a request to store or access a digital license and design file of a physical object that can be printed by a 3D printer. The new activity may comprise an update to the record being kept in the form of a blockchain. In some embodiments, for blockchain supported digital or physical record keeping, the new activity can correspond to the digital license of the design of a physical object and/or the transfer of the digital license from a first user device to a second user device. In some embodiments, the new activity may be broadcasted to a plurality of nodes on the network prior to step 701. In step 702, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 702, if the node successfully forms a block in step 705 prior to receiving a block from another node, the node broadcasts the block to other nodes over the network in step 706. In step 720, the node then adds the block to its copy of the blockchain. In the event that the node receives a block formed by another node in step 703 prior to being able to form the block, the node works to verify that the activity (e.g., authentication of transfer) recorded in the received block is authorized in step 704. In some embodiments, the node may further check the new block against system consensus rules for blocks and activities to verify whether the block is properly formed. If the new block is not authorized, the node may reject the block update and return to step 702 to continue to work to form the block. If the new block is verified by the node, the node may express its approval by adding the received block to its copy of the blockchain in step 720. After a block is added, the node then returns to step 701 to form the next block using the newly extended blockchain for the hash in the new block.

In some embodiments, in the event one or more blocks having the same block number is received after step 720, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 601.

Figure 8:
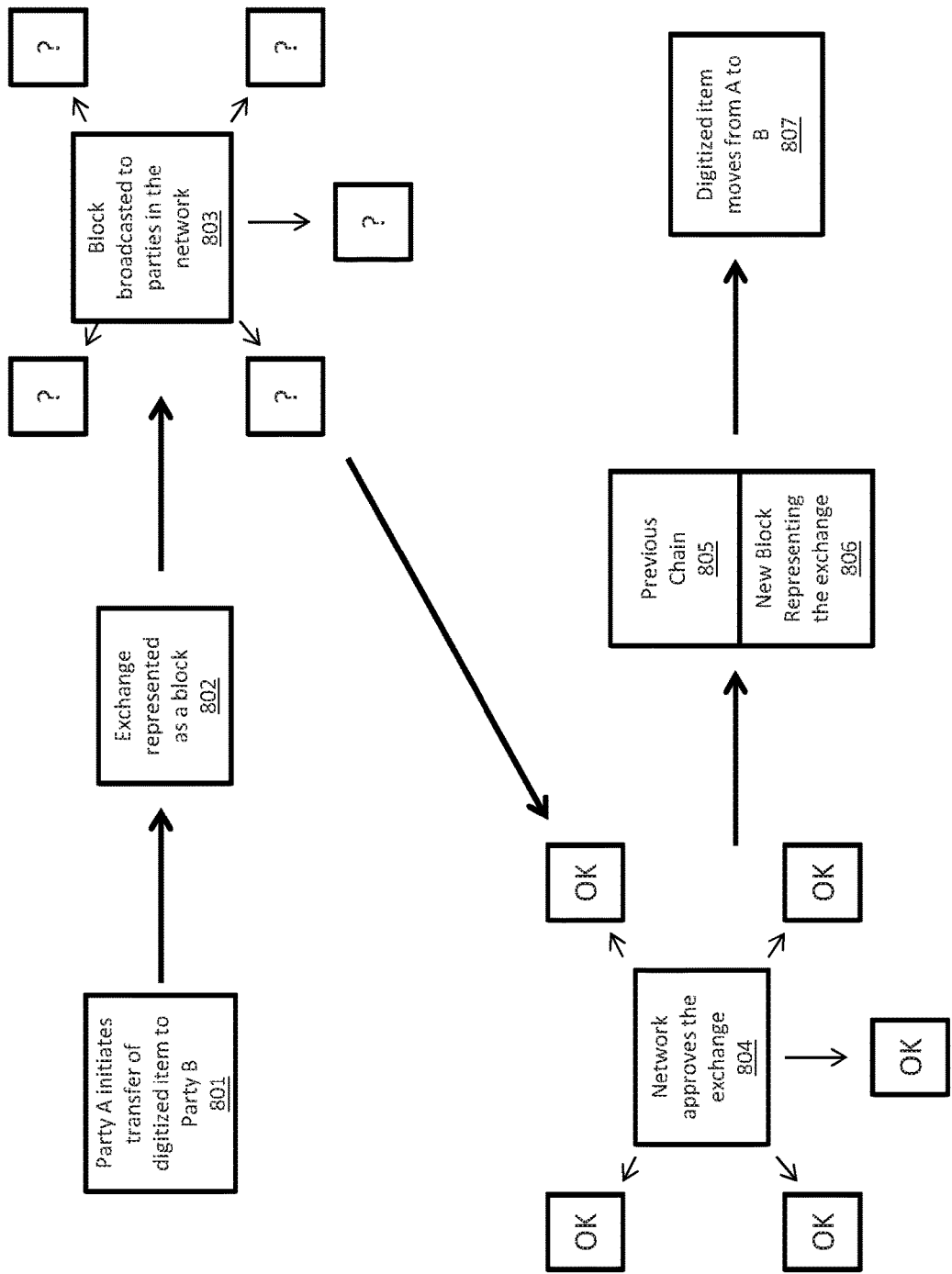
FIG. 8 comprises a process diagram as configured in accordance with an exemplary embodiment.

Now referring to FIG. 8, a process diagram a blockchain update according to some implementations in shown. In step 801, party A (the first user device) initiates the delivery and transfer of a digital license to party B (the second user device). In some embodiments, Party A may be authenticated by signing the transaction with a private key that may be verified with a public key in the previous transaction associated with the object to be transferred. In step 802, the authentication initiated in step 801 is represented as a block. In some embodiments, the transaction may be compared with transaction records in the longest chain in the distributed system to verify part A's authentication. In some embodiments, a plurality of nodes in the network may compete to form the block containing the authentication record. In some embodiments, nodes may be required to satisfy proof-of-work by solving a difficult mathematical problem to form the block. In some embodiments, other methods of proof such as proof-of-stake, proof-of-space, etc. may be used in the system. In step 803, the block is broadcasted to parties in the network. In step 804, nodes in the network authenticate party A by examining the block that contains the party A's authentication. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the object to be transferred). In some embodiments, a block may be approved with consensus of the nodes in the network. After a block is approved, the new block 806 representing the authentication is added to the existing chain 805 comprising blocks that chronologically precede the new block 806. The new block 806 may contain the transaction(s) and a hash of one or more blocks in the existing chain 805. In some embodiments, each node may then update their copy of the blockchain with the new block and continue to work on extending the chain with additional transactions. In step 807, when the chain is updated with the new block, the object can be transferred from party A to party B (e.g., from the first mobile autonomous electronic device to the second autonomous electronic device).

Figure 9:
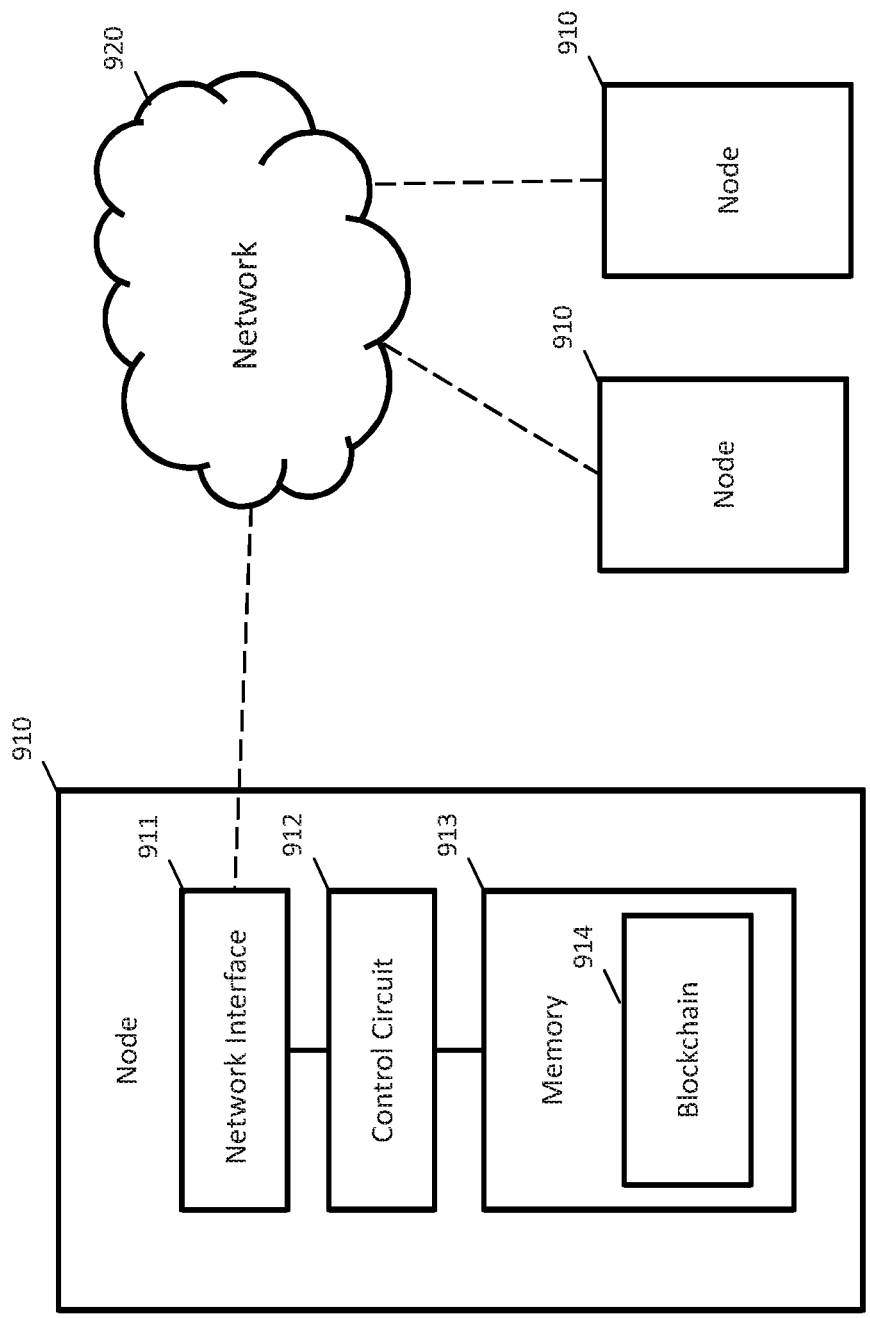
FIG. 9 comprise a system diagram configured in accordance with an exemplary embodiment.

Now referring to FIG. 9, a system according to some embodiments is shown. A distributed 3D printer blockchain system comprises a plurality of nodes 910 communicating over a network 920. In some embodiments, the nodes 910 may be comprise a distributed blockchain server and/or a distributed timestamp server. Each node 910 in the system comprises a network interface 911, a control circuit 912, and a memory 913.

The control circuit 912 may comprise a processor, a microprocessor, and the like and may be configured to execute computer readable instructions stored on a computer readable storage memory 913. The computer readable storage memory may comprise volatile and/or non-volatile memory and have stored upon it a set of computer readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 7-9 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

Figure 10:
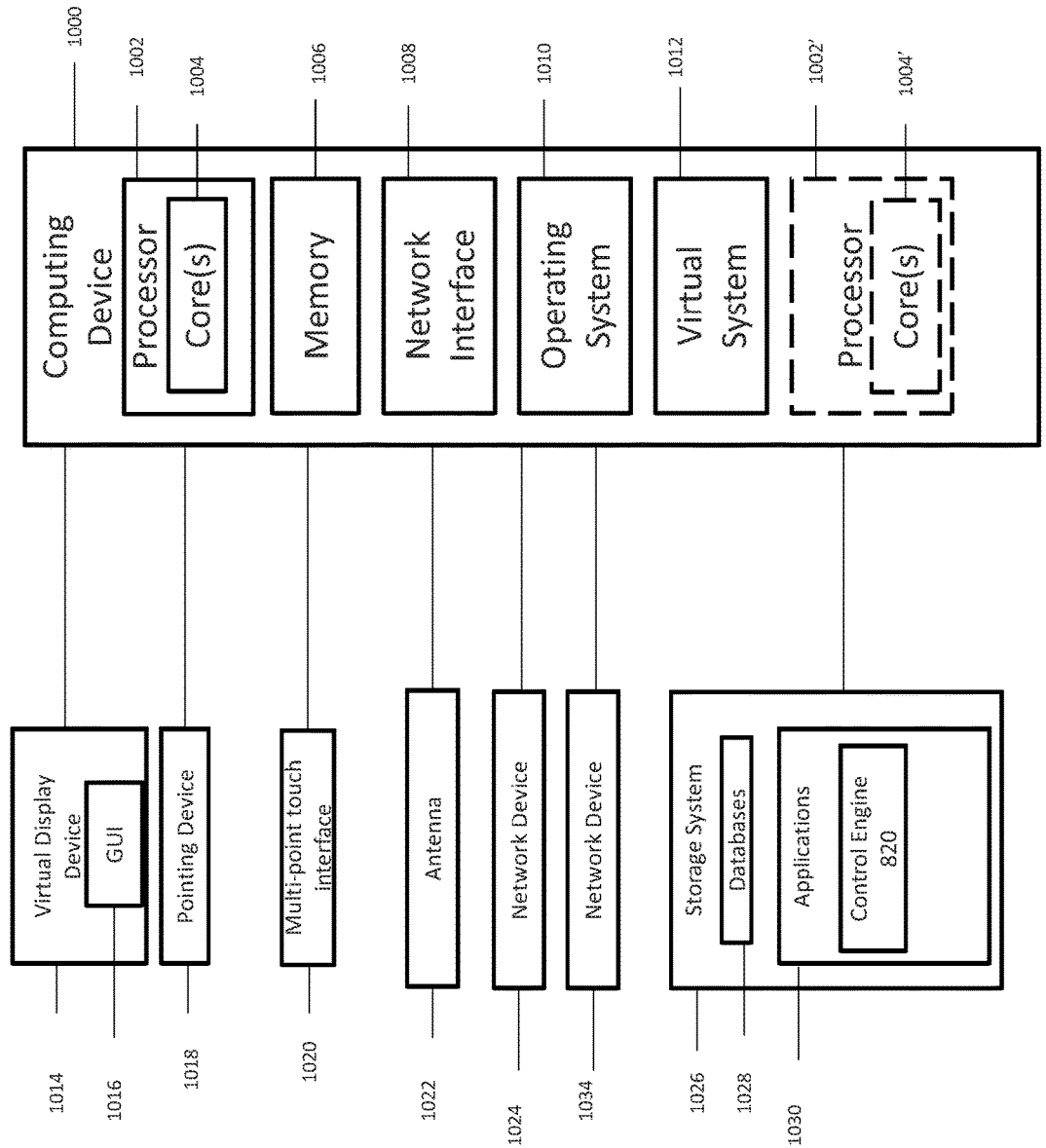
FIG. 10 illustrates a block diagram an exemplary computing device in accordance with an exemplary embodiment.

FIG. 10 is a block diagram of an example computing device for implementing exemplary embodiments of the present disclosure. Embodiments of the computing device 1000 can implement embodiments of the blockchain license storage system. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1006 included in the computing device 1000 may store computer-readable and computer-executable instructions or software (e.g., applications 1030 such as the control engine 420) for implementing exemplary operations of the computing device 1000. The computing device 1000 also includes configurable and/or programmable processor 1002 and associated core(s) 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for implementing exemplary embodiments of the present disclosure. Processor 1002 and processor(s) 1002' may each be a single core processor or multiple core (1004 and 1004') processor. Either or both of processor 1002 and processor(s) 1002' may be configured to execute one or more of the instructions described in connection with computing device 1000.

Virtualization may be employed in the computing device 1000 so that infrastructure and resources in the computing device 1000 may be shared dynamically. A virtual machine 1012 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 1006 may include other types of memory as well, or combinations thereof. The computing device 1000 can receive data from input/output devices such as, an image capturing device 1034. The image capturing device 1034 can capture still or moving images. A user may interact with the computing device 1000 through a visual display device 1014, such as a computer monitor, which may display one or more graphical user interfaces 1016, multi touch interface 1020 and a pointing device 1018.

The computing device 1000 may also include one or more storage devices 1026, such as a hard-drive, CD-ROM, or other computer readable media, for storing data and computer-readable instructions and/or software that implement exemplary embodiments of the present disclosure (e.g., applications such as the control engine 420). For example, exemplary storage device 1026 can include one or more databases 1028 for storing design files and information associated with representations of physical objects and licenses associated with the representations of the physical objects. The databases 1028 may be updated manually or automatically at any suitable time to add, delete, and/or update one or more data items in the databases.

The computing device 1000 can include a network interface 1008 configured to interface via one or more network devices 924 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 1022 to facilitate wireless communication (e.g., via the network interface) between the computing device 1000 and a network and/or between the computing device 1000 and other computing devices. The network interface 1008 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1010, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 1000 and performing the operations described herein. In exemplary embodiments, the operating system 1010 may be run in native mode or emulated mode. In an exemplary embodiment, the operating system 1010 may be run on one or more cloud machine instances.

Figure 11:
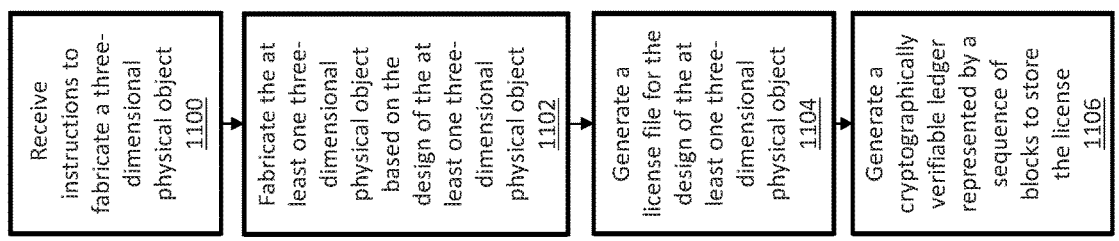
FIG. 11 is a flowchart illustrating the process of fabricating a physical object in a 3D printer blockchain system.

FIG. 11 is a flowchart illustrating the process of fabricating a physical object in a 3D printer blockchain system. In operation 1100, a computing system (e.g. computing system 400 as shown in FIG. 4) can receive instructions to fabricate a three-dimensional physical object (e.g. physical object 202 as shown in FIGS. 2-3) from a mobile device (e.g. device 100 as shown in FIGS. 1-2). The instructions can include a design of the three-dimensional physical object. In some embodiments, the physical representation can be an image captured by an image capturing device (e.g. image capturing device 105 as shown in FIG. 1). In other embodiments, the computing system can receive a request to access a design of a representation of a physical object. The request can include a public key and a private key associated with a block containing the digital license of the design. The computing system can provide access to the design of the representation of the physical object in response to verifying the public and private key. In operation 1102, the computing system can control a printing device (e.g. 3-D printer 200 as shown in FIGS. 2-3, 9) to fabricate the at least one three-dimensional physical object based on the design of the at least one three-dimensional physical object. In operation 1104, the computing system can generate a license file for the design of the at least one three-dimensional physical object. In operation 1106, the computing system can generate a cryptographically verifiable ledger (e.g. license blockchain storage 430 as shown in FIG. 4) represented by a sequence of blocks. Each block contains one or more transactions records and each subsequent block contains a hash value associated with the previous block. One of the blocks contains transaction records associated with the license file for the design of the at least one three-dimensional physical object. The block that contains transaction records associated with the license file restricts subsequent printing of the at least one three-dimensional physical object.

Figure 12:
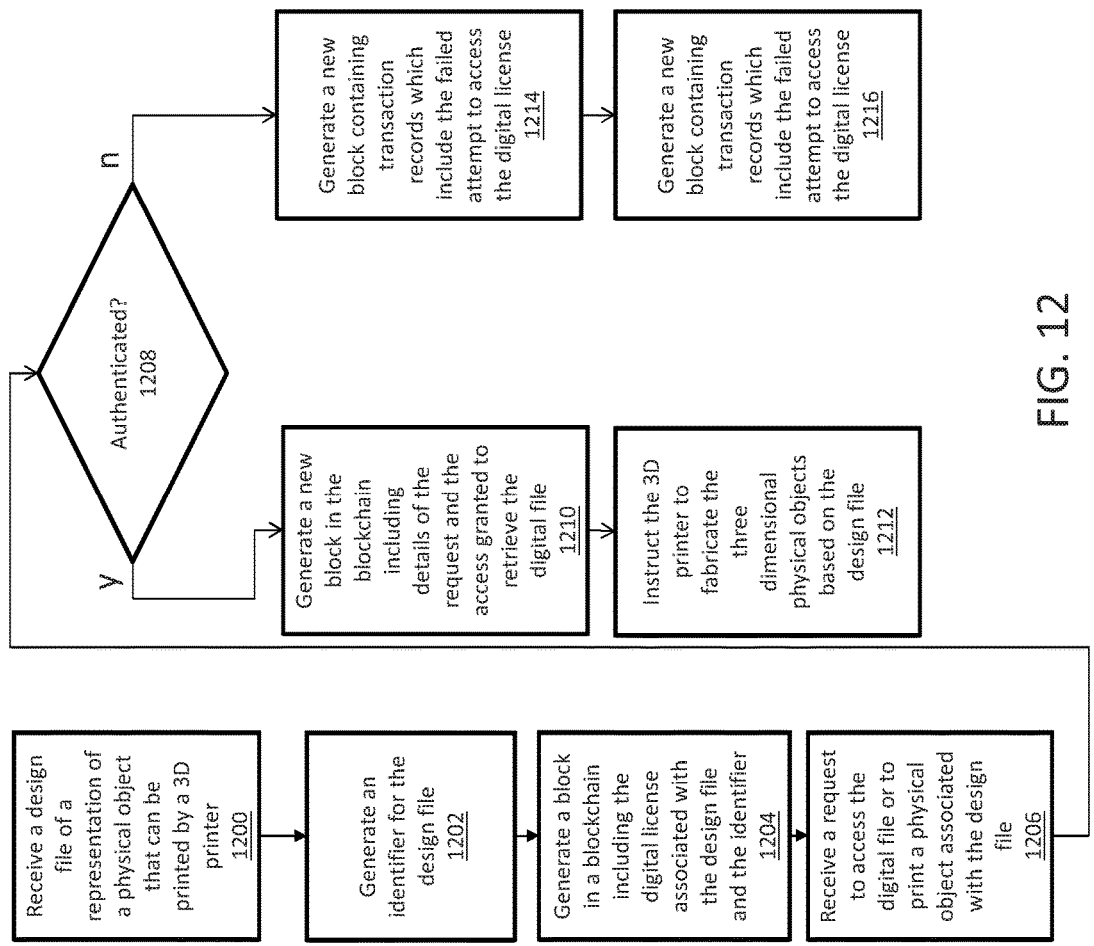
FIG. 12 is a flowchart illustrating the process of accessing a design file in a 3D printer blockchain system.

FIG. 12 is a flowchart illustrating the process of accessing a design file in a 3D printer blockchain system. In operation 1200, a computing system (e.g. computing system 400 as shown in FIG. 4) can receive a design file of a representation of a physical object that can be printed by a 3D printer (e.g. 3-D printer 200 as shown in FIGS. 2-3, 9). In operation 1202, the computing system can generate an identifier for the design file. In operation 1204, the computing system can generate a block in a blockchain including the digital license associated with the design file and the identifier of the design file. In operation 1206, the computing system, can receive a request to access the digital file or to print a physical object associated with the design file using the 3D printer. The request can include a string. In operation 1208, the computing system can attempt to authenticate the request based on the received string. In operation 1210, the computing system can authenticate the request and generate a new block in the blockchain including transaction records which contain the details of the request and the access granted to retrieve the digital file. In operation 1212, the computing system can instruct the 3D printer to fabricate the three dimensional physical objects based on the design file associated with the digital license and identifier stored in the access block. In operation 1214, the computing system can fail to authenticate the request and can generate a new block containing transaction records which include the failed attempt to access the digital license and identifier associated with the design file. In operation 1216, the computing system can prevent the 3D printer from printing the physical object associated with the design file.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for manufacture of user-specified physical objects, the system comprising:
a printing device configured to print three-dimensional physical objects;
a mobile device configured to generate a design file including instructions for fabrication of at least one three-dimensional physical object by the printing device, wherein the instructions include a design of the at least one three-dimensional physical object;
a computing system configured to be in selective communication with the mobile device and the printing device, the computing system programmed to:
receive the design file including the instructions to fabricate at least one three-dimensional physical object from the mobile device;
control the printing device to fabricate a first instance of the at least one three-dimensional physical object based on the design of the at least one three-dimensional physical object;
generate a license file for the design of the at least one three-dimensional physical object;
generate a cryptographically verifiable ledger represented by a sequence of blocks, each block containing one or more transactions records and each subsequent block containing a hash value associated with a previous block, wherein at least one blocks contains transaction records associated with the license file for the design of the at least one three-dimensional physical object, and wherein the at least one of the blocks that contains transaction records associated with the license file restricts subsequent printing of the at least one three-dimensional physical object;
receive a request to access the block containing transaction records associated with the license file for the design of the at least one three-dimensional physical object, wherein the request includes a first public key and a first private key associated with the at least one of the blocks that contains the transaction records associated with the license file; and
provide access to the license file for the design of the at least one three-dimensional physical object in response to verifying the public key and private key,
wherein in response to authorized access to the at least one of the block including the license file, the computing system is programmed to restrict access to the design file based on a quantity of digital licenses previously granted for the design file to prevent printing of the at least one three-dimensional physical object.

2. The system of claim 1, wherein the computing system is programmed to:
assign a unique identifier to the at least one three-dimensional physical object, wherein at least one block contains transaction records associated with the unique identifier.

3. The system of claim 2, wherein a RFID tag encoded with the unique identifier is secured to the at least one three-dimensional physical object.

4. The system of claim 1, wherein, in response to printing of a second instance of the at least one three-dimensional physical object by access to the design, the computing system adds a new block to the cryptographically verifiable ledger that contains transaction records associated with the license file for the design of the at least one three-dimensional physical object.

5. The system of claim 1, further comprising an image capturing device operatively coupled to the mobile device, the image capturing device configured to capture an image of an existing physical object.

6. The system of claim 5, wherein the mobile device is configured to generate a design of the at least one three-dimensional physical object based on the captured image of the existing physical object.

7. A method comprising:
receiving, via a computing system, a design file including instructions to fabricate at least one three-dimensional physical object from a mobile device, the instructions include a design of the at least one three-dimensional physical object;
controlling, via the computing system, a printing device to fabricate the at least one three-dimensional physical object based on the design of the at least one three-dimensional physical object;
generating, via the computing system, a license file for the design of the at least one three-dimensional physical object;
generating, via the computing system, a cryptographically verifiable ledger represented by a sequence of blocks, each block containing one or more transactions records and each subsequent block containing a hash value associated with a previous block, wherein at least one blocks contains transaction records associated with the license file for the design of the at least one 3D physical object, and wherein the at least one of the blocks that contains transaction records associated with the license file restricts subsequent printing of the at least one three-dimensional physical object;
receiving, via the computing system, a request to access the at least one of the blocks containing transaction records associated with the license file for the design of the at least one three-dimensional physical object, wherein the request includes a first public key and a first private key associated with the at least one of the blocks; and
providing, via the computing system, access to the license file for the design of the at least one three-dimensional physical object in response to verifying the public key and private key,
wherein in response to authorized access to the at least one of the block, the computing system is programmed to restrict access to the design file based on a quantity of digital licenses previously granted for the design file to prevent printing of the at least one three-dimensional physical object.

8. The method of claim 7, further comprising:
assigning, via the computing system, a unique identifier to the at least one three-dimensional physical object, wherein at least one block contains transaction records associated with the unique identifier.

9. The method of claim 8, wherein a RFID tag encoded with the unique identifier is secured to the at least one three-dimensional physical object.

10. The method of claim 7, further comprising capturing, via an image capturing device coupled to the mobile device, an image of an existing physical object.

11. The method of claim 10, further comprising, generating, via the mobile device, a design of a 3D physical object based on the captured image of the existing physical object.

12. One or more non-transitory computer readable memory media storing instructions, wherein the instructions are executable by one or more processors to:
- receive, via a computing system, a design file including instructions to fabricate at least one three-dimensional physical object from a mobile device, the instructions include a design of the at least one three-dimensional physical object;
- control, via the computing system, a printing device to fabricate the at least one three-dimensional physical object based on the design of the at least one three-dimensional physical object;
- generate, via the computing system, a license file for the design of the at least one three-dimensional physical object; and
- generate, via the computing system, a cryptographically verifiable ledger represented by a sequence of blocks, each block containing one or more transactions records and each subsequent block containing a hash value associated with a previous block, wherein at least one blocks contains transaction records associated with the license file for the design of the at least one three-dimensional physical object, and wherein the at least one of the blocks that contains transaction records associated with the license file restricts subsequent printing of the at least one three-dimensional physical object;
- receive, via the computing system, a request to access the at least one of the blocks containing transaction records associated with the license file for the design of the at least one three-dimensional physical object, wherein the request includes a first public key and a first private key associated with the at least one of the blocks; and
- provide, via the computing system, access to the license file for the design of the at least one three-dimensional physical object in response to verifying the public key and private key,
- wherein in response to authorized access to the at least one of the block, the computing system is programmed to restrict access to the design file based on number of digital licenses previously granted for the design file to prevent printing of the at least one three-dimensional physical object.

13. The one or more non-transitory computer readable media of claim 12, wherein execution of the instructions by the processor causes the processor to:
- assign, via the computing system, a unique identifier to the at least one three-dimensional physical object, wherein at least one block contains transaction records associated with the unique identifier.

14. The one or more non-transitory computer readable media of claim 13, wherein a RFID tag encoded with the unique identifier is secured to the at least one three-dimensional physical object.

15. The one or more non-transitory computer readable media of claim 13, wherein execution of the instructions by the processor causes the processor to: capture, via an image capturing device coupled to the mobile device, an image of an existing physical object.

16. The one or more non-transitory computer readable media of claim 15, wherein execution of the instructions by the processor causes the processor to: generate, via the mobile device, a design of a 3D physical object based on the captured image of the existing physical object.

* * * * *